United States Patent
Lake

(10) Patent No.: US 6,210,828 B1
(45) Date of Patent: *Apr. 3, 2001

(54) THIN-PROFILE BATTERY ELECTRODE CONNECTION MEMBERS, BUTTON-TYPE BATTERY ELECTRODE CONNECTION MEMBERS, THIN PROFILE BATTERY CONSTRUCTIONS AND BUTTON-TYPE BATTERY CONSTRUCTIONS

(75) Inventor: Rickie C. Lake, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/343,435

(22) Filed: Jun. 30, 1999

Related U.S. Application Data

(63) Continuation of application No. 08/954,224, filed on Oct. 20, 1997, now Pat. No. 5,998,061.

(51) Int. Cl.⁷ .............................. H01M 6/42; H01M 2/24; H01M 6/12
(52) U.S. Cl. ........................ 429/157; 429/158; 429/162
(58) Field of Search .................................. 429/162, 163, 429/157, 158

(56) References Cited

U.S. PATENT DOCUMENTS 3,891,462   6/1975   Langkau .
5,536,596   7/1996   Lake ..................................... 429/162
5,601,941   2/1997   Tuttle ................................... 429/121
5,998,061 * 12/1999  Lake ..................................... 429/157

\* cited by examiner

Primary Examiner—Stephen Kalafut
Assistant Examiner—Tracy Dove
(74) Attorney, Agent, or Firm—Wells, St. John, Roberts, Gregory & Matkin P.S.

(57) ABSTRACT

Thin-profile battery electrode connection members, button-type battery electrode connection members, thin-profile battery constructions, button-type battery constructions, and methods of establishing electrical connections with and between both thin-profile batteries and button-type batteries are described. In one implementation, an electrode connection member comprises an inner conductive surface, and outer peripheral conductive surface, and an intermediate conductive surface joined with and extending between the inner and outer surfaces. The connection member defines an internal volume which is sized to receive at least one thin-profile battery. In one aspect, the intermediate conductive surface tapers between the inner and outer surfaces. The taper enables more than one thin-profile battery to be mounted within the internal volume without the need for edge insulation material over one of the batteries to prevent grounding. The electrode connection member can be mounted on a substrate for providing a generally self-contained, space-conserving power source which can include more than one battery connected in a series electrical connection.

29 Claims, 5 Drawing Sheets

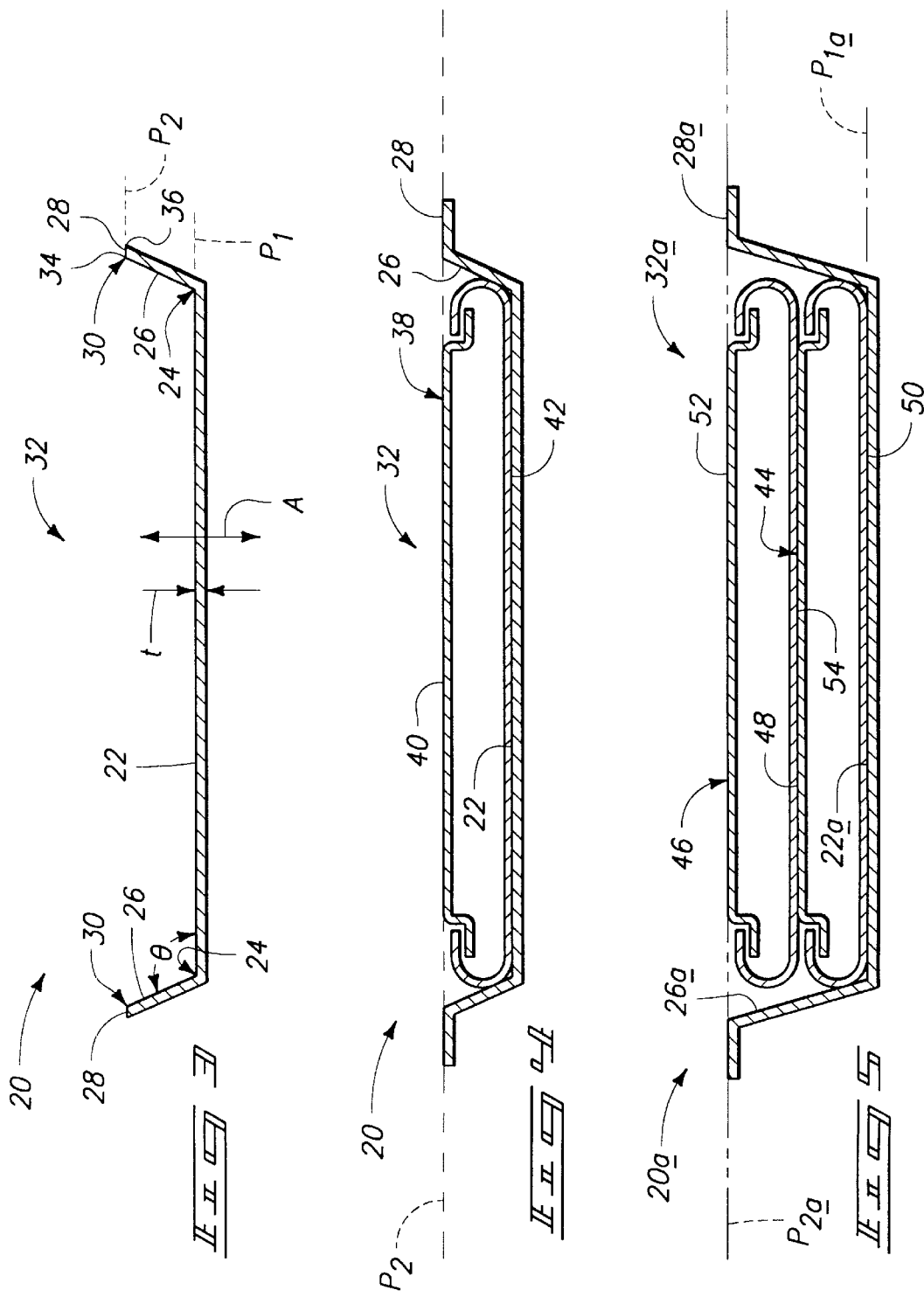

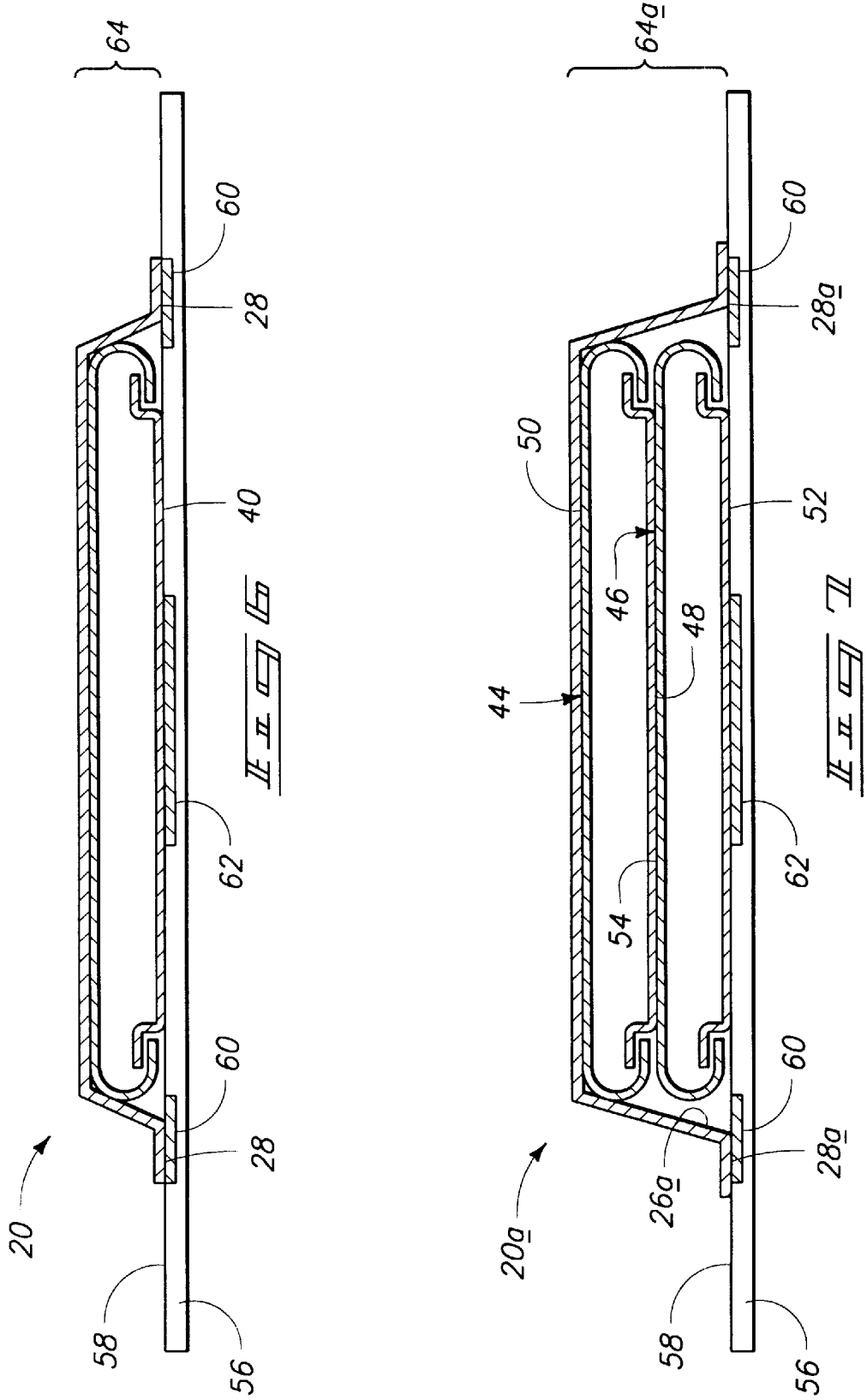

THIN-PROFILE BATTERY ELECTRODE CONNECTION MEMBERS, BUTTON-TYPE BATTERY ELECTRODE CONNECTION MEMBERS, THIN PROFILE BATTERY CONSTRUCTIONS AND BUTTON-TYPE BATTERY CONSTRUCTIONS

RELATED PATENT DATA

This patent resulted from a continuation application of U.S. patent application Ser. No. 08/954,224, filed Oct. 20, 1997, entitled "Thin-Profile Battery Electrode Connection Members, Button-Type Battery Electrode Connection Members, Thin-Profile Battery Constructions, Button-Type Battery Constructions, Methods Of Forming Thin-Profile Battery Electrode Connection Members, Button-Type Battery Electrode Connection Members, Thin-Profile Battery Constructions, And Button-Type Battery Constructions, And Methods Of Establishing Electrical Connections", naming Rickie C. Lake as inventor, and which is now U.S. Pat. No. 5,998,061, the disclosure of which is incorporated by reference.

TECHNICAL FIELD

This invention relates to thin-profile battery electrode connection members, button-type battery electrode connection members, thin-profile battery constructions, button-type battery constructions, and methods of establishing electrical connections with and between both thin-profile batteries and button-type batteries.

BACKGROUND OF THE INVENTION

Thin-profile batteries are characterized by having thickness dimensions which are less than a maximum linear dimension of its anode or cathode. One type of thin-profile battery is a button-type battery. Such batteries, because of their compact size, permit electronic devices to be built which themselves are very small or compact. When a higher voltage is needed in such devices, the batteries can be stacked or cascaded with one another to achieve a series electrical connection. When the electrical devices with which such batteries are used are small in dimension, it is desirable to configure one or more of the batteries in such a way as to conserve or minimize the space requirements necessary to achieve a desirable electrical connection between the batteries and other components of the device.

This invention arose out of concerns associated with improving the structures and methods through which thin-profile or button-type batteries are interconnected with one another and with electrical devices.

SUMMARY OF THE INVENTION

Thin-profile battery electrode connection members, button-type battery electrode connection members, thin-profile battery constructions, button-type battery constructions, and methods of establishing electrical connections with and between both thin-profile batteries and button-type batteries are described. In one implementation, an electrode connection member comprises an inner conductive surface, and outer peripheral conductive surface, and an intermediate conductive surface joined with and extending between the inner and outer surfaces. The connection member defines an internal volume which is sized to receive at least one thin-profile battery. In one aspect, the intermediate conductive surface tapers between the inner and outer surfaces. The taper enables more than one thin-profile battery to be mounted within the internal volume without the need for edge insulation material over one of the batteries to prevent grounding. The electrode connection member can be mounted on a substrate for providing a generally self-contained, space-conserving power source which can include more than one battery connected in a series electrical connection.

BRIEF DESCRIPTION OF THE DRAWINGS

Preferred embodiments of the invention are described below with reference to the following accompanying drawings.

FIG. 3 is a side sectional view of an electrode connection member formed in accordance with another aspect of the invention.

FIG. 4 is a side sectional view of the FIG. 1 electrode connection member within which a thin-profile battery is received.

FIG. 5 is a side sectional view of an electrode connection member which is formed in accordance with another aspect of the invention and within which two thin-profile batteries are received.

FIG. 6 is a view of the FIG. 4 electrode connection member mounted on a substrate.

FIG. 7 is a view of the FIG. 5 electrode connection member mounted on a substrate.

DETAILED DESCRIPTION OF THE PREFERRED EMBODIMENTS

Figure 1:
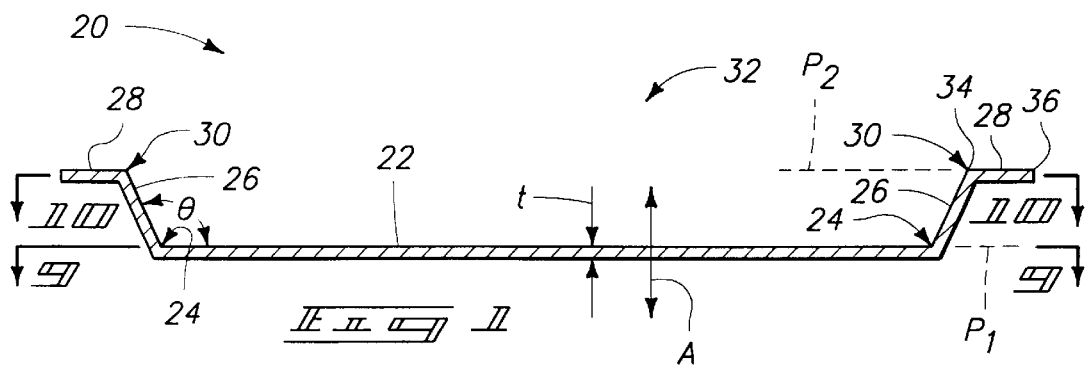
FIG. 1 is a side sectional view of an electrode connection member formed in accordance with one aspect of the invention.
Figure 2:
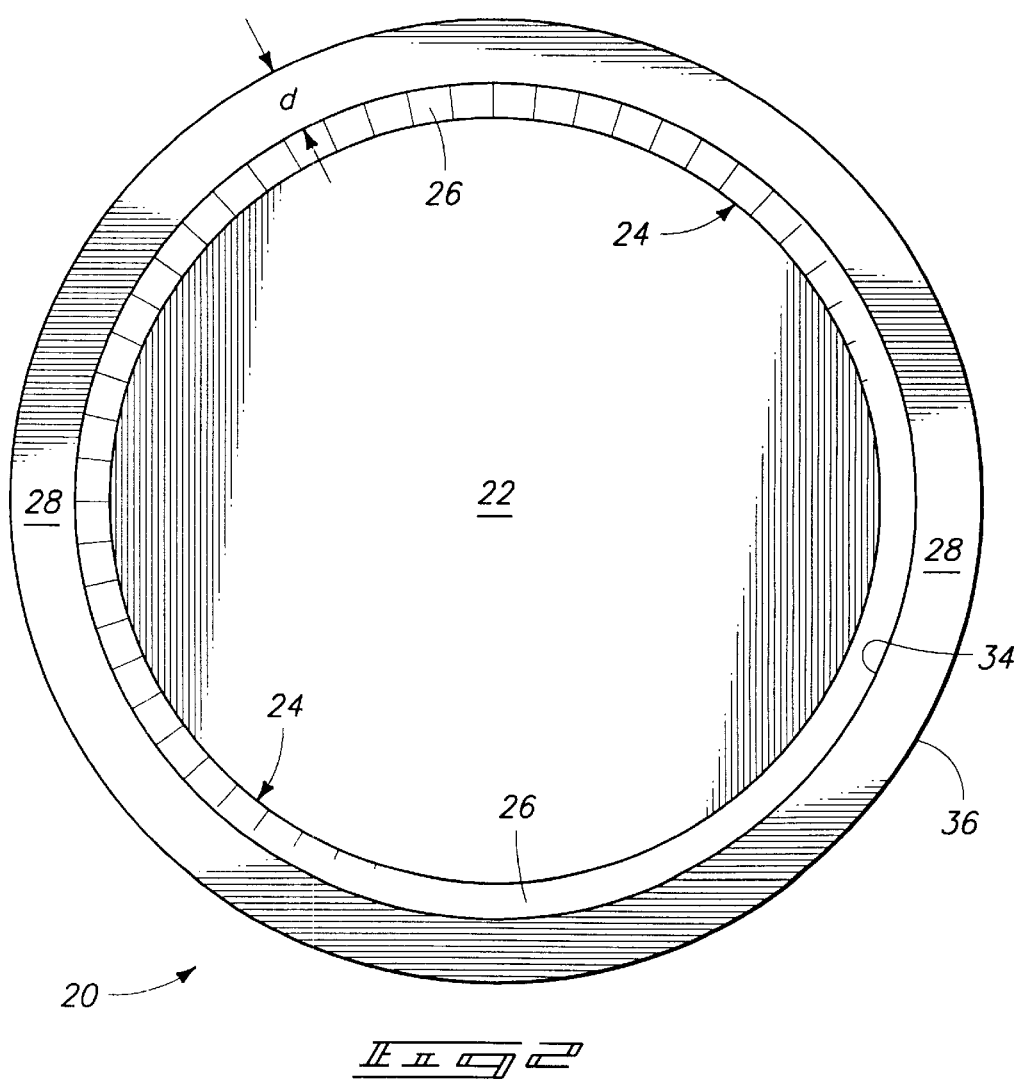
FIG. 2 is a top plan view of the FIG. 1 electrode connection member.

This disclosure of the invention is submitted in furtherance of the constitutional purposes of the U.S. Patent Laws "to promote the progress of science and useful arts" (Article 1, Section 8).

Referring to FIGS. 1, 2, 9, and 10, a connection member or container is shown generally at 20 and is configured for use with at least one thin-profile or button-type battery. Connection member 20 can comprise any suitable conductive material such as nickel foil, stainless steel sheet, metal screen mesh, and the like, and can be formed by stamping, etching, drawing, or molding any of such materials. Connection member 20 includes an inner conductive electrode connection surface 22 which is sized to receive and form an electrical connection with a battery electrode surface as will become apparent below. A battery electrode surface is mounted over or atop surface 22 and can be fixed in place with conductive epoxy. Accordingly, surface 22 can be considered as a mounting surface. At least a portion of surface 22 is generally planar and is oriented within a mounting surface plane $P_1$. Connection surface 22 has an outermost boundary edge 24 which is generally circular in shape.

A conductive side or intermediate surface 26 is provided and is joined with connection surface 22 proximate outermost boundary edge 24. The outermost boundary edge defines a joinder location between surfaces 22, 26, with both surfaces extending generally away therefrom. In the illustrated example, surface 26 tapers to extend generally outwardly from connection surface 22 and define a generally frustum-shaped side surface.

An outer peripheral conductive surface or rim 28 is provided and is joined with side surface 26 proximate a joinder location 30. Outer surface or rim 28 defines an opening into an internal volume 32 which is defined by connection surface 22 and side surface 26. Internal volume 32 is sized to receive a substantial portion of at least one thin-profile or button-type battery. Side surface 26 tapers generally outwardly from joinder location 24 toward joinder location 30. The rim defines a terminus of side surface 26. Outer surface 28 is oriented within a plane $P_2$ which is generally parallel with plane $P_1$. Side surface 26 includes at least a portion which extends away from plane $P_1$ at an angle $\theta$ which is generally oblique relative thereto. Other angles $\theta$ are of course possible. In the illustrated example, a substantial portion of side surface 26 extends away at the angle $\theta$. Surface 26 is dimensioned to achieve substantial alignment between outer surface 28 and a battery electrode surface of a thin-profile or button-type battery which is received within connection member 20.

In one aspect, connection member 20 has a thickness dimension t adjacent inner conductive surface 22 and in a direction A which is normal to plane $P_1$. Outer surface or rim 28 includes first and second boundary edges 34, 36 respectively, which have a minimum separation distance d therebetween. First and second boundary edges 34, 36 are generally circular in shape and concentric with one another. In the illustrated example, minimum separation distance d is greater than the thickness dimension t of connection member 20.

FIG. 3 shows a connection member 20 which is similar in construction to the FIG. 1 connection member except that outer surface or rim 28 defines a minimum separation distance d which is approximately equal to thickness dimension t.

Figure 9:
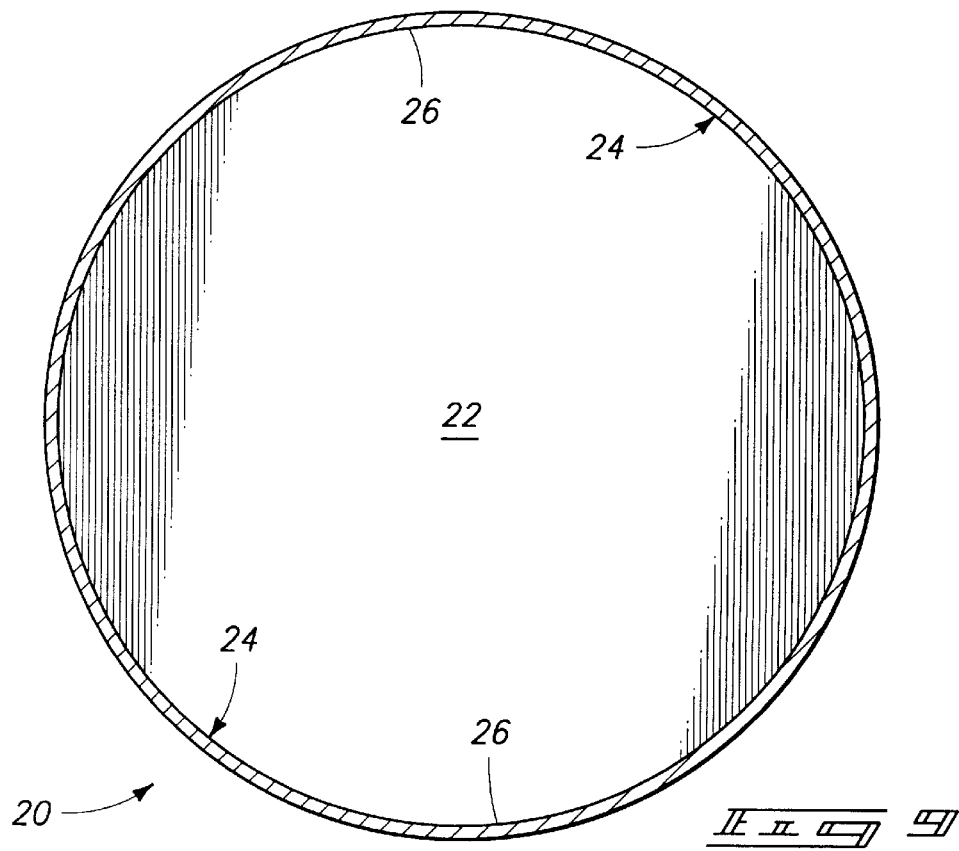
FIG. 9 is a view which is taken along line 9—9 in FIG. 1.
Figure 10:
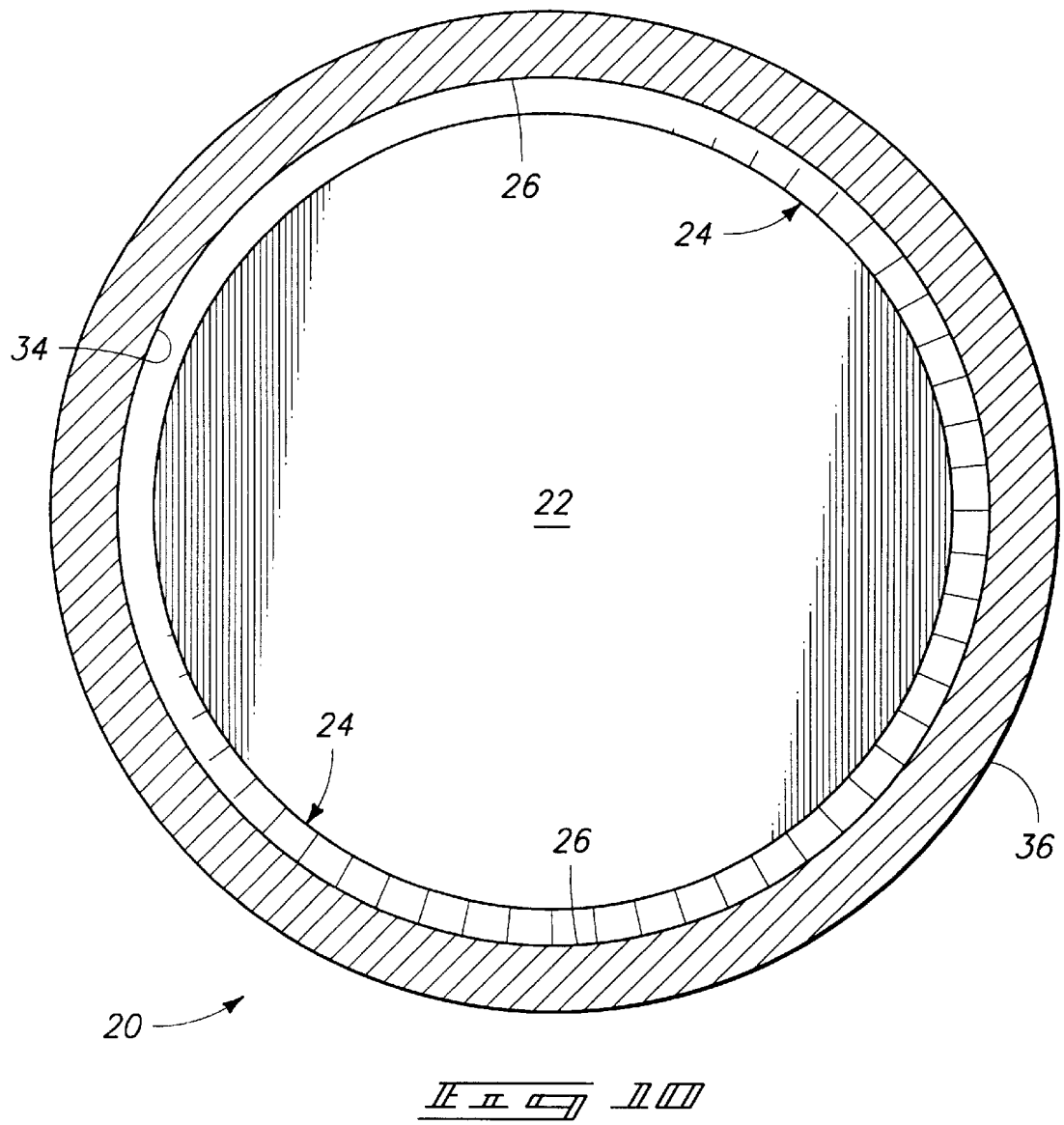
FIG. 10 is a view which is taken along line 10—10 in FIG. 1.

FIGS. 9 and 10 illustrate different cuts which are taken through connection member 20 of FIG. 1. FIG. 9 shows a first portion or cut comprising side surface 26 which is taken through line 9—9 in FIG. 1. FIG. 10 shows a second portion or cut comprising side surface 26 which is taken through line 10—10 in FIG. 1. The side surface portions bound respective first and second areas inside surface 26 and within internal volume 32 which lie in respective first and second planes. The first and second planes are spaced from one another and the areas defined therewithin are different from one another. In the illustrated example, the first and second planes are generally parallel with one another and with plane $P_1$. The first plane (FIG. 9) is disposed closer to connection surface 22 than the second plane (FIG. 10). In the illustrated example, the first area is less than the second area.

Referring to FIG. 4, an exemplary thin-profile battery comprising a button-type battery 38 is placed or mounted on connection member 20 and received within internal volume 32. Battery 38 includes a pair of terminal housing members which define a pair of outwardly-facing electrodes 40, 42. Electrode 40 comprises the lid or anode electrode of the battery and electrode 42 comprises the can or cathode electrode of the battery. Side surface 26 is dimensioned to achieve substantial alignment of outer surface 28 and electrode surface 40. Such is observed as plane $P_2$ is seen to be generally coincident with surface 40. Electrode 42 is conductively received against surface 22 and accordingly establishes electrical communication between electrode surface 42 and connection member 20. Accordingly, a single battery is provided and comprises different respective surfaces with which electrical connection is made with connection member 20, and substantial alignment is achieved with outer surface 28. Conductive adhesion with epoxy or other suitable bonding techniques such as welding can be utilized to fixedly mount battery 38 within connection member 20, if desired.

Referring to FIG. 5, a connection member which is formed in accordance with an alternate embodiment of the present invention is shown generally at 20a. Like numerals from the above-described embodiment are utilized where appropriate, with differences being indicated by the suffix "a" or with different numerals. Accordingly, mounting surface 22a and side surface 26a define an internal volume 32a which is sized to receive substantial portions of two thin-profile batteries 44, 46. For purposes of the ongoing discussion, battery 44 comprises a first battery and battery 46 comprises a second battery. The batteries are oriented in a stack, one atop the other, and can be conductively bonded together if desired. Battery 44 includes a pair of terminal housing members comprising lid and can terminals. The lid and can terminals respectively define a pair of outwardly-facing battery electrode surfaces 48, 50. Battery 46 includes a pair of terminal housing members comprising lid and can terminals. The lid and can terminals respectively define a pair of outwardly facing battery electrode surfaces 52, 54. Side surface 26a is dimensioned to achieve substantial alignment of outer surface 28a and battery electrode surface 52. Accordingly, substantial alignment is achieved with an electrode surface of a different battery from which desired electrical connection is made with connection surface 22a.

Side surface 26a of connection member 20a extends away from connection surface 22a sufficiently to bring at least a portion of the side surface into abutting physical engagement with only one of the batteries received within internal volume 32a. In the illustrated example, such abutting engagement is achieved with battery 44 only and not with battery 46 by imparting a desired degree of taper to side surface 26a. The illustrated side surface 26a is generally frustum-shaped which is similar to the one-battery embodiment of FIG. 4. By virtue of the angularity of side surface 26a relative to surface 22a, no electrical insulation is necessary to protect battery 46 from undesirably grounding against the side surface. Such insulation can, however, be provided if desired.

FIGS. 6 and 7 show a substrate portion 56 having a generally planar substrate surface 58. The substrate can comprise a printed circuit substrate, i.e. printed circuit board, or a flexible circuit board and the like. A pair of spaced electrical contacts or contact pads 60, 62 are supported by substrate 56. Contact 60 comprises two different spaced portions which are each laterally spaced from contact 62. Exemplary materials for the contact pads include screen- or stencil-printed conductive materials such as copper or conductive printed thick film (PTF). The material from which contacts 60, 62 are formed can be either recessed within substrate 56 or disposed atop the substrate. In the context of this document, both constructions are seen to provide a generally planar outer surface adjacent which one or more batteries can be mounted or received.

Outer surfaces or rims 28 (FIG. 6), 28a (FIG. 7) are disposed against substrate surface 58. Surface 58 substantially encloses the battery or batteries received within the respective internal volumes 32, 32a. Accordingly, containers 20, 20a and substrate surface 58 define respective enclosures 64, 64a inside of which a battery or batteries are received. Electrode surfaces 40 (FIG. 6), 52 (FIG. 7) are conductively received against contact pad 62, while outer surfaces 28, 28a are conductively received against contact pad 60. Outer surfaces 28, 28a can be conductively bonded to the contact pads by conductive epoxy. Accordingly an electrical circuit connection is formed.

Figure 8:
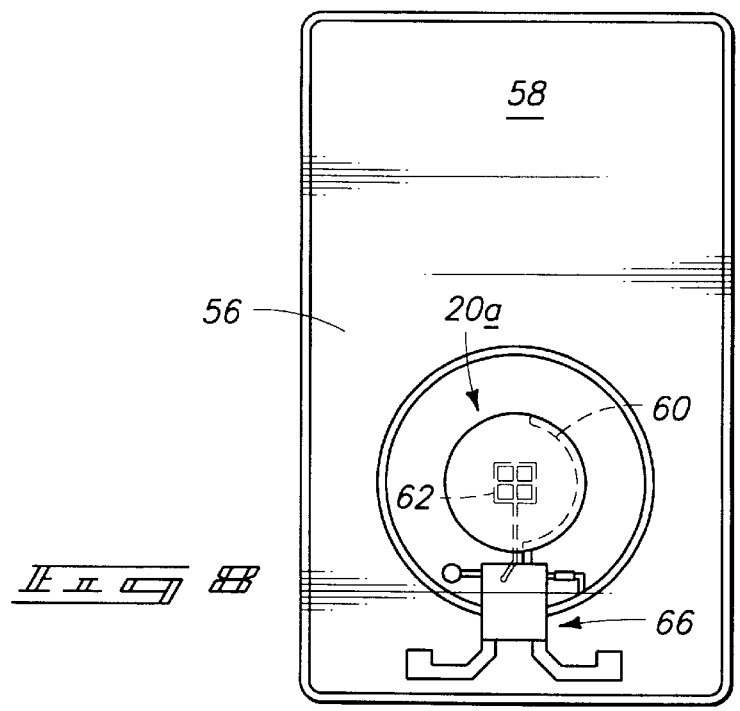
FIG. 8 is a view of an exemplary electronic device which incorporates an electrode connection member and battery stack in accordance with the invention.

Referring to FIG. 7, batteries 44, 46 are conductively connected together in a stack which defines a series electrical connection. A first electrical connection is defined between electrode surface 48 of battery 44 and electrode surface 54 of battery 46. Such electrical connection can arise from a mere physical engagement of the batteries or through the application of a suitable conductive epoxy material or other bonding agent to effectively conductively bond the two together. A second electrical connection is provided between electrode surface 50 of battery 44 and electrode surface 52 of battery 46. In the illustrated example, the second electrical connection is provided through the respective contact pads which operably connect with circuitry which is external to the batteries. An exemplary arrangement is shown in FIG. 8 where a single integrated circuitry chip 66 is mounted over substrate 56. Connection member 20a is received over the substrate and operably mounted thereon so that the batteries are placed into electrical communication with chip 66. The contact pads are defined by conductive traces which form, together with chip 66, the second electrical connection mentioned above. In the illustrated and preferred embodiment, chip 66 is configured for wireless radio frequency communication. An exemplary chip is described is U.S. patent application Ser. No. 08/705,043, which names James O'Toole, John R. Tuttle, Mark E. Tuttle, Tyler Lowrey, Kevin Devereaux, George Pax, Brian Higgins, Shu-Sun Yu, David Ovard and Robert Rotzoll as inventors, which was filed on Aug. 29, 1996, is assigned to the assignee of this patent application, and is fully incorporated herein by reference.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A thin-profile battery electrode connection member comprising:

a conductive battery electrode connection surface; and a conductive generally frustum-shaped side surface joined with the connection surface and defining together therewith an internal volume sized to receive at least most all of at least one thin-profile battery having a thickness which is less than a maximum linear dimension of the thin-profile battery.

2. The thin-profile battery electrode connection member of claim 1, wherein the side surface tapers outwardly from the electrode connection surface.

3. The thin-profile battery electrode connection member of claim 1, wherein the electrode connection surface is generally circular in shape and the side surface tapers generally outwardly from the electrode connection surface.

4. A thin-profile battery electrode connection member comprising:

a conductive battery electrode connection surface; and a conductive generally frustum-shaped side surface joined with the connection surface and defining together therewith an internal volume sized to receive substantial portions of each of at least two thin-profile batteries having a respective thickness which is less than a maximum linear dimension of the respective thin-profile battery.

5. The thin-profile battery electrode connection member of claim 4, wherein the side surface extends away from the electrode connection surface sufficient to bring at least a portion of the side surface into abutting engagement with only one of the thin-profile batteries.

6. The thin-profile battery electrode connection member of claim 4, wherein the side surface tapers outwardly from the electrode connection surface.

7. The thin-profile battery electrode connection member of claim 4, wherein the side surface tapers outwardly from the electrode connection surface and defines a desired degree of taper, the desired degree of taper being sufficient to bring a least a portion of the side surface into abutting engagement with only one of the thin-profile batteries.

8. The thin-profile battery electrode connection member of claim 4, wherein the internal volume is sized to receive substantial portions of each of at least two thin-profile batteries in a stack.

9. A button-type battery electrode connection member comprising:

a conductive button-type battery electrode connection surface; and a conductive generally frustum-shaped side joined with the connection surface and defining together therewith an internal volume sized to receive at least most all of at least one button-type battery.

10. A button-type battery electrode connection member comprising:

a conductive button-type battery electrode connection surface; and a conductive generally frustum-shaped side surface joined with the connection surface and defining together therewith an internal volume sized to receive substantial portions of each of at least two button-type batteries.

11. The button-type battery electrode connection member of claim 10, wherein the frustum-shaped side surface comprises a portion which physically engages only one of the at least two button-type batteries.

12. The button-type battery electrode connection member of claim 9, wherein the internal volume is sized to receive substantial portions of at least two button-type batteries which are stacked one atop the other and wherein the frustum-shaped side surface is configured to physically engage only one of the at least two button-type batteries.

13. A thin-profile battery electrode connection member comprising:

an inner conductive surface configured to establish electrical communication with one battery electrode surface of a thin-profile battery received by the connection member;

an outer peripheral conductive surface, the inner and outer surfaces being oriented within respective planes which are generally parallel with one another; and an intermediate conductive surface joined with and extending between the inner and outer surfaces, the surfaces collectively defining a container for receiving at least one thin-profile battery, the intermediate surface being dimensioned to achieve substantial elevational alignment of the outer surface and a second battery electrode surface of a thin-profile battery received by the connection member.

14. The thin-profile battery electrode connection member of claim 13, wherein the one battery electrode surface and the second battery electrode surface comprise different electrode surfaces of a single thin-profile battery.

15. The thin-profile battery electrode connection member of claim 13, wherein the one battery electrode surface and the second battery electrode surface comprise different electrode surfaces of different thin-profile batteries.

16. The thin-profile battery electrode connection member of claim 13, wherein the intermediate conductive surface includes at least a portion which extends at an angle which is oblique relative to the inner conductive surface plane.

17. The thin-profile battery electrode connection member of claim 16, wherein the one battery electrode surface and the second battery electrode surface comprise different electrode surfaces of different thin-profile batteries.

18. The thin-profile battery electrode connection member of claim 16, wherein a substantial portion of the intermediate conductive surface extends at the angle which is oblique relative to the inner conductive surface.

19. The thin-profile battery electrode connection member of claim 13, wherein:
the intermediate conductive surface joins with the inner and outer conductive surfaces at respective joinder locations; and
the intermediate conductive surface tapers between the joinder locations.

20. The thin-profile battery electrode connection member of claim 19, wherein the intermediate conductive surface tapers outwardly from the joinder location at the inner conductive surface toward the joinder location at the outer conductive surface.

21. The thin-profile battery electrode connection member of claim 13, wherein:
the connection member has a thickness dimension adjacent the inner conductive surface and in a direction which is normal to a plane defined by the inner conductive surface; and
the outer conductive surface comprises first and second boundary edges having a minimum separation distance therebetween which is greater than the thickness dimension of the connection member.

22. The thin-profile battery electrode connection member of claim 21, wherein the first and second boundary edges are generally circular in shape and concentric with one another.

23. The thin-profile battery electrode connection member of claim 4, wherein the internal volume is sized to receive at least most all of each of at least two thin-profile batteries.

24. The thin-profile battery electrode connection member of claim 4, wherein the internal volume is sized to receive all of each of at least two thin-profile batteries.

25. The thin-profile battery electrode connection member of claim 1, wherein the internal volume is sized to receive all of at least one thin-profile battery.

26. The button-type battery electrode connection member of claim 9, wherein the internal volume is sized to receive all of at least one button-type battery.

27. The button-type battery electrode connection member of claim 10, wherein the internal volume is sized to receive at least most all of each of at least two button-type batteries.

28. The button-type battery electrode connection member of claim 10, wherein the internal volume is sized to receive all of each of at least two button-type batteries.

29. The thin-profile battery electrode connection member of claim 21, wherein the intermediate surface is dimensioned to achieve exact elevational alignment of the outer surface and the second battery electrode surface of a thin-profile battery received by the connection member.

\* \* \* \* \*

UNITED STATES PATENT AND TRADEMARK OFFICE
CERTIFICATE OF CORRECTION

PATENT NO. : 6,210,828 B1 Page 1 of 1
DATED : April 3, 2001
INVENTOR(S) : Rickie C. Lake It is certified that error appears in the above-identified patent and that said Letters Patent is hereby corrected as shown below:

Column 6,
Line 33, replace "side joined" with -- side surface joined --.

Signed and Sealed this

Eighteenth Day of December, 2001

Attest:

JAMES E. ROGAN
*Attesting Officer*     *Director of the United States Patent and Trademark Office*